(12) United States Patent
Bulthuis et al.

(10) Patent No.: US 6,768,842 B2
(45) Date of Patent: Jul. 27, 2004

(54) ARRAYED WAVEGUIDE GRATING

(75) Inventors: Hindrick Freerk Bulthuis, Enschede (NL); Remco Stoffer, Enschede (NL); Gunter Beelen, Zoutleeuw (BE)

(73) Assignee: Alcatel Optronics UK Limited, Livingston (GB)

( * ) Notice: Subject to any disclaimer, the term of this patent is extended or adjusted under 35 U.S.C. 154(b) by 0 days.

(21) Appl. No.: 10/237,802

(22) Filed: Sep. 10, 2002

(65) Prior Publication Data

US 2003/0063858 A1 Apr. 3, 2003

(30) Foreign Application Priority Data

Sep. 11, 2001 (GB) .......................................... 0121883.3

(51) Int. Cl.[7] .............................. G02B 6/34; G02B 6/00
(52) U.S. Cl. .......................................... 385/37; 385/24
(58) Field of Search .............................. 385/10, 16, 24, 385/31, 37, 39, 50, 88–90, 129, 147

(56) References Cited

U.S. PATENT DOCUMENTS

| | | | |
|---|---|---|---|
| 6,169,838 B1 * | 1/2001 | He et al. ..................... | 385/129 |
| 6,222,956 B1 | 4/2001 | Akiba et al. | |
| 6,515,776 B1 * | 2/2003 | Naganuma ................... | 398/82 |
| 6,526,203 B1 * | 2/2003 | Gonzalez et al. ............. | 385/37 |
| 6,549,688 B2 * | 4/2003 | Bazylenko ................... | 385/14 |
| 6,563,988 B2 * | 5/2003 | McGreer ..................... | 385/43 |
| 6,625,187 B1 * | 9/2003 | Ikoma et al. ................. | 372/43 |

FOREIGN PATENT DOCUMENTS

JP        2001-13336 A     1/2001

OTHER PUBLICATIONS

Reinhard Marz: "Integrated Optics, Design and Modeling", International Standard Book No.: 0–89006–668–X, 1995, pp. 276–281.

* cited by examiner

Primary Examiner—Akm Enayet Ullah
(74) Attorney, Agent, or Firm—Sughrue Mion, PLLC (57) ABSTRACT

In an arrayed waveguide grating (AWG) comprising fist and second slab waveguides and an array of waveguides optically coupled therebetween, the angle of the array waveguides at the slab waveguides is chirped according to the following equation:

$$\theta_i = ArcSine\ (i.\Delta\theta), \text{ where } i=-(N-1)/2,\ -(N-1)/2+1,\ \ldots,\ +(N-1)/2$$

where i is the array waveguide number, N is the number of array waveguides, and $\Delta\theta$ is a constant. The chirping removes third-order aberration (COMA) which would otherwise cause asymmetry in the AWG output channel signals, especially where the AWG has a flattened passband.

18 Claims, 8 Drawing Sheets

ARRAYED WAVEGUIDE GRATING

FIELD OF THE INVENTION

The present invention relates to arrayed waveguide gratings (AWGs). In particular, though not exclusively, the invention concerns passband flattening in AWGs and an improvement for increasing passband uniformity in AWGs having flattened passbands.

BACKGROUND TO THE INVENTION

AWGs, sometimes also known as "phasars" or "phased arrays", are now well-known components in the optical communications network industry. An AWG is a planar structure comprising an array of waveguides arranged side-by-side which together act like a diffraction grating in a spectrometer. AWGs can be used as multiplexers and as demultiplexers, and a single AWG design can commonly be used both as a multiplexer and demultiplexer. The construction and operation of such AWGs is well known in the art. See for example, "PHASAR-based WDM-Devices: Principles, Design and Applications", M K Smit, IEEE Journal of Selected Topics in Quantum Electronics Vol.2, No.2, June 1996, and U.S. Pat. No. 5,002,350 and WO97/23969.

Figure 1:
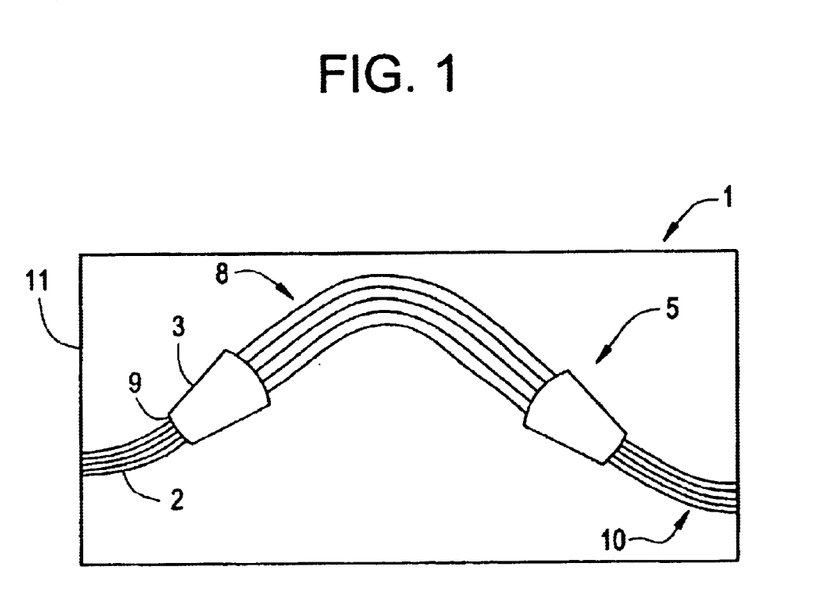
FIG. 1 is a schematic plan view of a conventional AWG.

A typical AWG mux/demux 1 is illustrated in FIG. 1 and comprises a substrate or "die" 1 having provided thereon an arrayed waveguide grating 5 consisting of an array of channel waveguides 8, only some of which are shown, which are optically coupled between two free space regions 3,4 each in the form of a slab waveguide. At least one substantially single mode input waveguide 2 is optically coupled to an input face 9 of the first slab waveguide 3 for inputting a multiplexed input signal thereto, and a plurality of substantially single mode output waveguides 10 (only some shown) are optically coupled to an output face 20 of the second slab waveguide 4 for outputting respective wavelength channel outputs therefrom to the edge 12 of the die 1. The array waveguides all have an aiming point $C_1$ which is located on the output face 20 of the second slab waveguide 4 and which is the centre of curvature of the input face 15 of the second slab waveguide which input face lies on an arc of radius R. This arc of radius R is also sometimes referred to as the "grating line". The output face of the second slab waveguide lies on an arc, sometimes referred to as the "focal line", having a radius $R/2$ and a centre of curvature $C_2$. The centres of curvature $C_1$, $C_2$ of the input and output faces 15,20 of the second slab 4 lie on a straight line X. The array waveguides 8 are all equally angularly spaced, there being a fixed angle $\Delta\alpha$ between neighboring array waveguides, with respect to the centre of curvature $C_1$ of the input face 15 of the slab waveguide 4. There is also a fixed lateral spacing $d_a$ between neighboring array waveguides 8, at their interface with the slab waveguide 4. The input and output faces of the first slab waveguide have a similar (but inverted) arrangement, as indicated in FIG. 1.

In generally known manner, there is a constant predetermined optical path length difference between the lengths of adjacent channel waveguides 8 in the array (typically the physical length of the waveguides increases incrementally by the same amount from one waveguide to the next) which determines the position of the different wavelength output channels on the output face of the second slab coupler 4. Typically, the physical length of the waveguides increases incrementally by the same amount, $\Delta L$, from one waveguide to the next, where $$\Delta L = m\lambda_c/n_c$$

where $\lambda_c$ is the central wavelength of the grating, $n_c$ is the effective refractive index of the array waveguides, and m is an integer number. In known manner, the transmission waveguides and slab waveguides are typically formed (e.g. using standard photolithographic techniques) as "cores" on a silicon substrate (an oxide layer and/or cladding layer may be provided on the substrate prior to depositing the waveguide cores) and are covered in a cladding material, this being done for example by Flame Hydrolysis Deposition (FHD) or Chemical Vapour Deposition (CVD) fabrication processes.

Figure 3A:
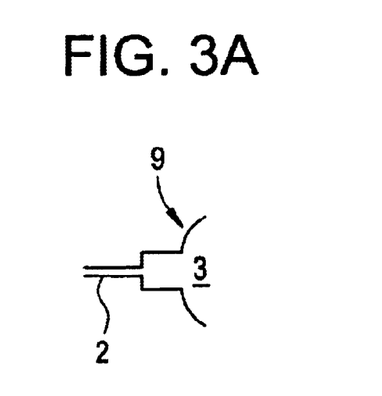
FIG. 3(a) is a schematic plan view of an MMI for passband flattening.

In such an AWG, the passband (i.e. shape of the transmission spectrum $T(\lambda)$, which is a plot of dB Insertion Loss against Wavelength) for each output channel generally corresponds to the coupling of a Gaussian beam into a Gaussian waveguide, and is therefore itself Gaussian-shaped. In many situations it would be more desirable for the AWG to have a flat passband. This is generally because a Gaussian passband requires accurate control over emitted wavelengths, thus making it difficult to use in a system. Various ways of achieving a flat passband have been proposed, one way being to use "near field shaping". This involves creating a double-peaked mode field from the (single peak) input mode field. When this double-peaked field is convoluted with the single mode output waveguide, the resulting passband takes the form of a single, generally flat peak. One way of creating the necessary double-peaked field is to use an MMI (Multi-Mode Interferometer) on the end of the input waveguide (or each input waveguide, where there is more than one), adjacent the first slab coupler, as shown in FIG. 3(a). The MMI creates higher order modes from the single mode input signal and these multiple modes give rise to a double-peaked field at the output of the MMI.

Figure 3B:
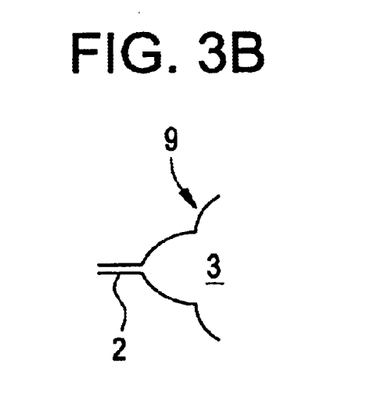
FIG. 3(b) is a schematic plan view of a parabolic horn for passband flattening.

U.S. Pat. No. 5,629,992 (Amersfoort) describes this passband flattening technique in detail. An alternative technique is to use a parabolic-shaped taper or "horn" on the end of the input waveguide, as shown in FIG. 3(b). This is described in JP 9297228A. The parabolic taper gives rise to continuous mode expansion (by excitation of higher order modes) of the input signal along the length of the taper, until both the fundamental and second order modes are present, thus forming a double-peaked field at the output end of the taper. Other non-adiabatic multimode waveguide taper shapes can alternatively be used to achieve the desired passband flattening effect, for example a curvilinear taper shape based on a cosine curve, as described in our pending UK Patent application No. 0114608.3 the entire contents of which are incorporated herein by reference.

Figure 3C:
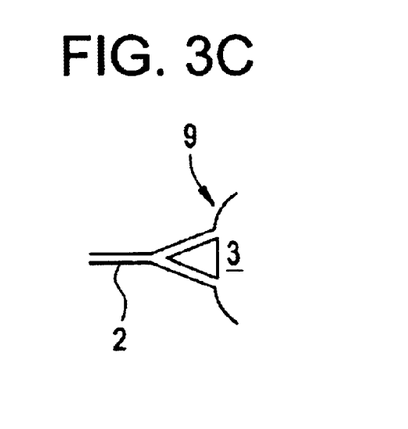
FIG. 3(c) is a schematic plan view of a Y-branch coupler for passband flattening.

Near-field shaping to produce the desired multiple peak field at the input to the first slab waveguide can also be achieved using other techniques such as a Y-branch coupler, as described in U.S. Pat. No. 5,412,744 and illustrated in FIG. 3(c), which splits the input single mode field into two peaks. Another technique is the adiabatic mode shaper structure described in our pending UK patent application No. 0114494.8 which uses an extra tapered waveguide disposed adjacent the or each input waveguide to convert the single peak field of the input waveguide to a double peak field.

Figure 4:
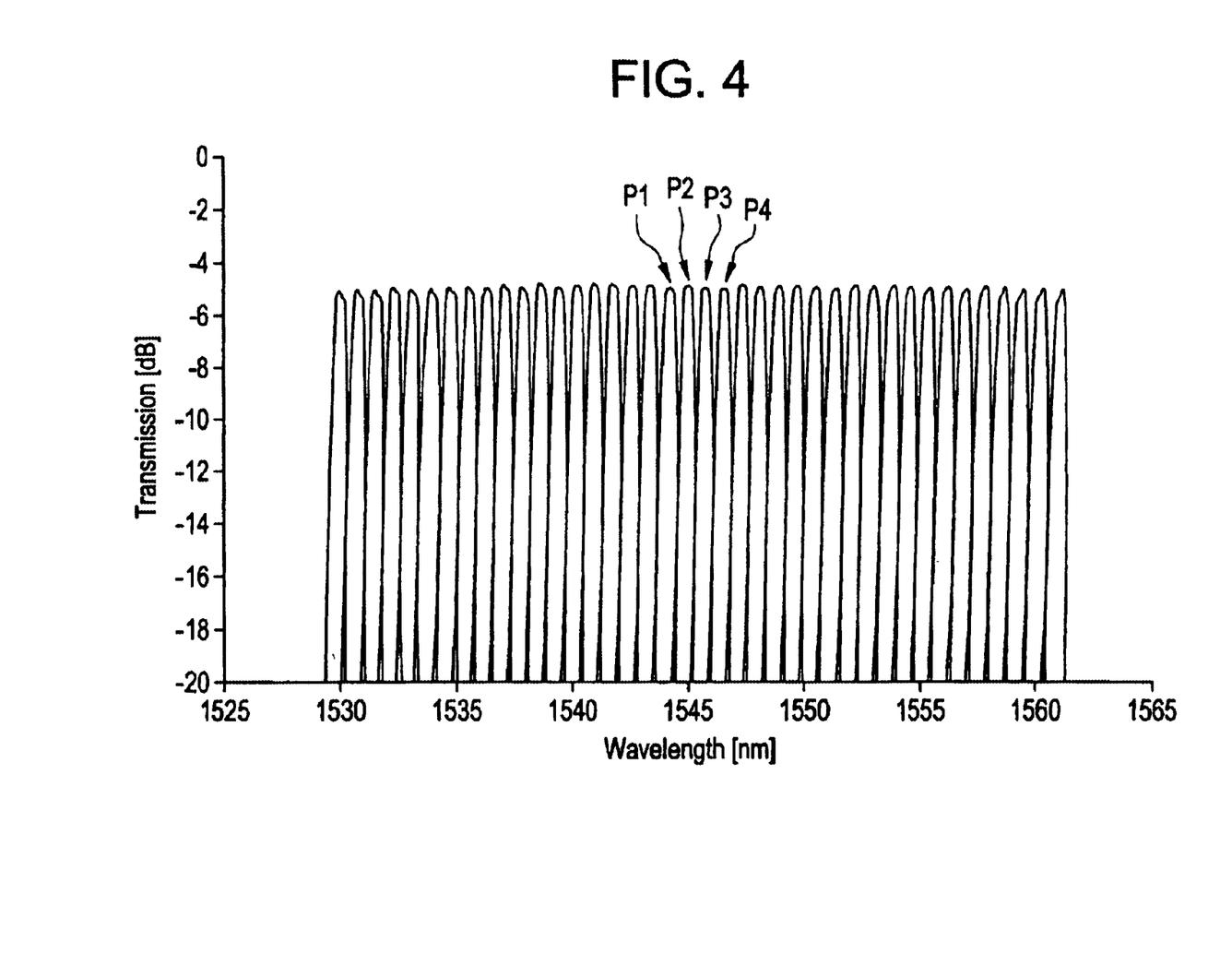
FIG. 4 is a graph of the passband of an 40 channel AWG like that of FIG. 1, modified to incorporate a passband flattening feature.

However, when any of the above-described features (namely the MMI, parabolic horn, multimode waveguide, Y-branch coupler or other passband flattening structure) are employed for the purpose of passband flattening, it is found that AWGs fabricated according to these designs in practice suffer from asymmetry in the passbands of different wavelength output channels. This is illustrated in FIG. 4 which shows that although the passbands P1,P2,P3,P4 (plotted as the Transmission, in dB, against wavelength, $\lambda$) of the central four output channels of the AWG are generally symmetrical as expected, the passbands of the other channels become asymmetrical to the right and left of these central four, the asymmetry in the channels to the right being generally inverse to the asymmetry in the channels to the left. This asymmetry is believed to be caused by off-axis aberrations (sometimes referred to as "COMA") in the second slab waveguide 4. The further the optical signal condenses away from the aiming point $C_1$ of the array waveguides on the output face 20 of the slab waveguide 4, the greater the asymmetry in the passband becomes. One undesirable effect of this asymmetry is that it causes undesirable fluctuation in insertion loss with variation in wavelength of the input optical signal.

This asymmetry effect in the flattened passband is also noted in Published Japanese Patent Application No. Hei 11-180118. The proposed solution in this patent application involves varying gradually the relative angular spacing, at the slab/array interface, of the array waveguides across the array so as to empirically correct for the off-axis aberrations which cause the asymmetry in the passband. However, the given formula does not provide an exact solution i.e. it does not completely remove the COMA aberration.

Figure 5:
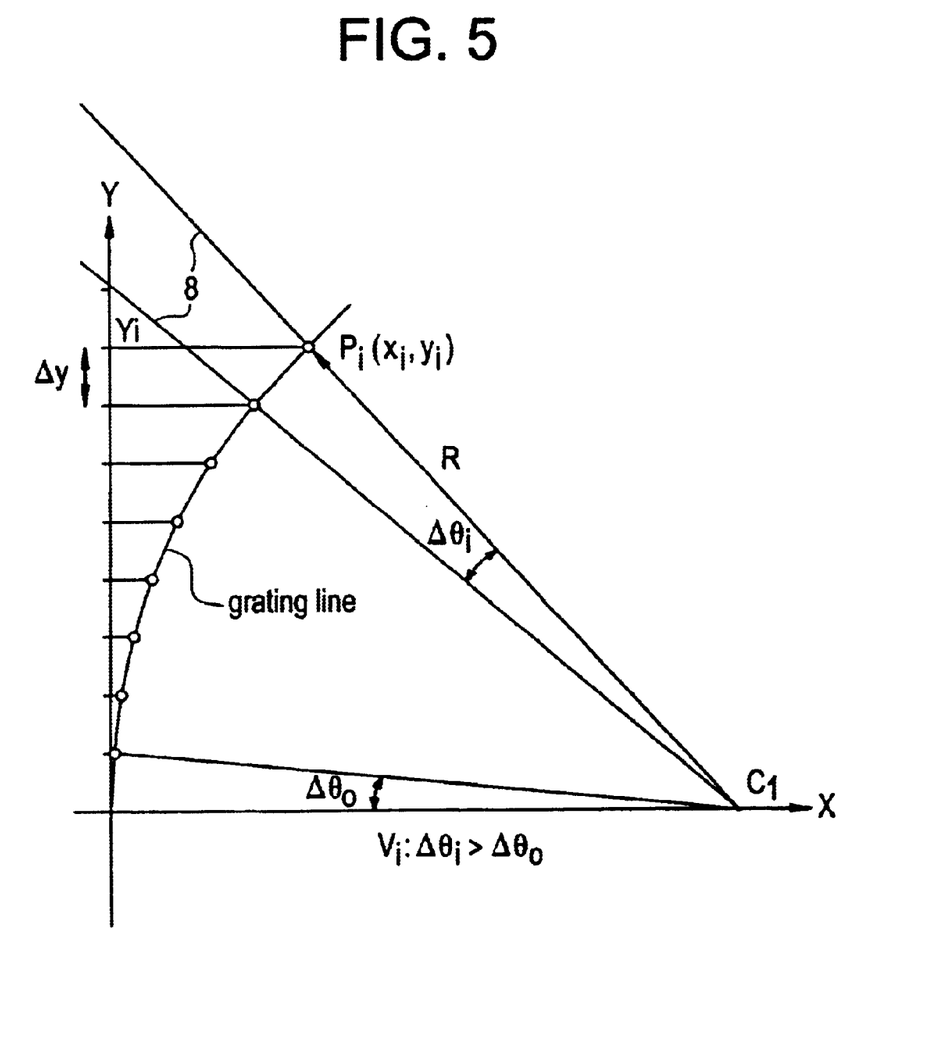
FIG. 5 is a diagram illustrating a Rowland mounting as described by R. Marz in the afore-mentioned book "integrated Optics: Design and Modelling"

The existence of COMA in phasars, and the need to remove it is acknowledged and described in detail in "Integrated Optics: Design and Modelling" by Reinhard Marz, Copyright 1995, by Artech House, Inc, ISBN 0-89006-668-X., Chapter 8, in particular pages 277–280. It is noted by Marz on page 279 that phased arrays based on Rowland mountings as described therein, have no COMA. According to Marz, the groove function of a Rowland mounting must be linear along the tangent to the grating line of the phasar. As illustrated in FIG. 5, this means that the lateral spacing $\Delta y$ between adjacent array waveguides at the array slab interface (i.e. the grating line), measured along the tangent to the grating line (the Y-axis in FIG. 5), is uniform across the array, and that the angular spacing $\Delta\theta_i$ of the adjacent array waveguides (on the grating line) varies gradually across the array, such that $\Delta\theta_i > \Delta\theta_0$ where $\Delta\theta_0$ is the angular spacing of the central two array waveguides. This is contrary to the teaching of all the well-known papers and patents relating to phasar design, such as the Smit review paper mentioned above) and the first patents relating to phasars e.g. U.S. Pat. No. 5,002,350 (Dragone), U.S. Pat. No. 5,243,672 (Dragone), which have always taught that the array waveguides should always be equally spaced, both angularly and laterally, on the grating line (which is the slab/array waveguides interface). Marz's phasar designs are derived from blazed grating theory, which he has then applied to phasar design. He does not disclose the type of AWG design proposed by Smit and Dragone in which the lateral and angular spacing of the arrayed waveguides on the grating line is constant across the array, as described herein with reference to FIG. 1, nor address passband flattening in such AWGs and the problem of asymmetry in the flattened passband due to the presence of COMA, nor does he address the problem of how to remove COMA from AWGs of this type.

It is an aim of the present invention to avoid or minimize one or more of the foregoing disadvantages.

According to a first aspect of the present invention there is provided an arrayed waveguide grating (AWG) comprising:

first and second slab waveguides and an array of waveguides optically coupled between the first slab waveguide and the second slab waveguide, the array waveguides having predetermined optical path length differences therebetween, and each said slab waveguide having a first side which is optically coupled to the array waveguides and which has a first radius of curvature, and an opposing second side which has a second radius of curvature which is substantially half the magnitude of the first radius of curvature; and a plurality of output waveguides optically coupled to the second side of the second slab waveguide; wherein at the first side of the second slab waveguide the array waveguide angle $\theta_i$ of the ith array waveguide, with respect to a straight line passing through the centres of curvature of the first and second sides of the second slab waveguide, is defined substantially by the following equation:

$$\theta_i = ArcSine\ (i.\Delta\theta), \text{ where } i = -(N-1)/2, -(N-1)/2+1, \ldots, +(N-1)/2$$

where i is the array waveguide number, N is the number of array waveguides, and $\Delta\theta$ is a constant. This constant $\Delta\theta$ may be substantially equal to the angular spacing, at the first side of the second slab waveguide, of the two array waveguides at the centre of the array.

In this case the third order aberration (COMA) from the second slab waveguide is substantially removed. Thus, there is no longer any asymmetry (or in practice no significant asymmetry) in the AWG channel outputs due to COMA from the second slab waveguide.

The array waveguide angle $\theta_i$ may be defined exactly by the above equation:

$$\theta_i = ArcSine\ (i.\Delta\theta), \text{ where } i = -(N-1)/2, -(N-1)/2+1, \ldots, +(N-1)/2.$$

Alternatively, the function ArcSine $(i.\Delta\theta)$ in the above equation may be approximated by, for example, taking the third order (or a higher order) Taylor expansion of the function, whereby the array waveguide angle $\theta_i$ is defined by the following equation: $\theta_i = i\Delta\theta + \frac{1}{6}\ (i^3.\Delta\theta^3)$. With this approximation, the array waveguide angle $\theta_i$ is still substantially defined by the function ArcSine $(i.\Delta\theta)$. Due to the presence of the third order term, the COMA will still be corrected.

Even if the function $\theta_i(i)$ contains higher order terms, this will not affect removal of the COMA. Thus, according to another aspect of the invention there is provided an AWG comprising first and second slab waveguides and an array of waveguides optically coupled between the first slab waveguide and the second slab waveguide, the array waveguides having predetermined optical path length differences therebetween, and each said slab waveguide having a first side which is optically coupled to the array waveguides and which has a first radius of curvature, and an opposing second side which has a second radius of curvature which is substantially half the magnitude of the first radius of curvature; and a plurality of output waveguides optically coupled to the second side of the second slab waveguide; wherein at the first side of the second slab waveguide the array waveguide angle $\theta_i$ of the ith array waveguide, with respect to a straight line passing through the centres of curvature of the first and second sides of the second slab waveguide, is defined substantially by a function $\theta_i(i)$, where:

$$\theta_i(i) = i\Delta\theta + a.i^2 + \frac{1}{6}(i^3.\Delta\theta^3) + b.i^4 + c.i^5 + d.i^6 + \ldots,$$

where i is the array waveguide number, $\Delta\theta$ is a constant, and a,b,c,d, . . . are all constants. One or more of a,b,c,d . . . may be zero.

Preferably, the output waveguides are substantially single-mode waveguides and the AWG further includes at least one substantially single-mode input waveguide optically coupled to the second side of the first slab waveguide, and passband flattening means disposed between at least one of the substantially single mode input and output waveguides and an adjacent one of the first and second slab waveguides. Where there is only a single input waveguide, the optical axis of the input waveguide, and of any passband flattening means coupled thereto, is preferably aligned with the centres of curvature of the first and second sides of the first slab waveguide. In this case, there will be substantially no asymmetry in the channel output signals due to COMA from the first slab waveguide. Since the COMA from the second slab waveguide has already been removed, a uniform (or in practice substantially uniform) flattened passband shape across all the output channels of the AWG is achieved.

Alternatively, if the optical axis of the input waveguide, and any passband flattening means coupled thereto, does not intersect with the second side of the first slab at the centre of curvature of the first side of the first slab (we refer to this as an off-centre input waveguide), then there will be asymmetry in the demultiplexed signals in the AWG output channels which is due to COMA from the first slab waveguide, unless the angular spacing of the array waveguides at the first slab is also chirped to remove this COMA. Thus, in the AWG according to the above-described first aspect of the invention, the array waveguide angle $\theta_i$ of the ith array waveguide, at the first side of the first slab waveguide, with respect to a straight line passing through the centres of curvature of the first and second sides of the first slab waveguide, is preferably defined substantially by the equation:

$$\theta_i = ArcSine\ (i.\Delta\theta),\ \text{where}\ i=-(N-1)/2,\ -(N-1)/2+1,\ \ldots,\ +(N-1)/2$$

where i is the array waveguide number, N is the number of array waveguides, and $\Delta\theta$ is a constant which may be substantially equal to the angular spacing, at the first side of the first slab waveguide, of the two array waveguides at the centre of the array. In this AWG there will be substantially no COMA present from either the first or second slab waveguide, even if an off-centre input waveguide is used. Where there is more than one input waveguide, any of the input waveguides can thus be used to input the multiplexed input signal to the first slab, without introducing asymmetry in the AWG output channel signals due to COMA from the first slab waveguide. Again, the function ArcSine (i.Δθ) may be approximated to its third order Taylor expansion, namely $i\Delta\theta + \frac{1}{6}(i^3.\Delta\theta^3)$.

The passband flattening means may comprise any suitable feature which causes flattening of the normally Gaussian-shaped passband of the AWG. For example, the passband flattening means may comprise a multi-mode interferometer (MMI), a parabolic horn, a Y-branch coupler, an adiabatic mode shaper as described in our pending British Patent Application No. 0114494.8, or a tapered waveguide such as described in our pending British patent application No. 0114608.3. Thus, the passband flattening means may comprise a non-adiabatic tapered waveguide which widens in width towards the respective slab waveguide, and at least an initial portion of the non-adiabatic tapered waveguide, which initial portion is connected to said at least one of the substantially single mode input and output waveguides, has a taper angle which increases towards said respective slab waveguide, and the non-adiabatic tapered waveguide merges substantially continuously with said at least one of the substantially single mode input and output waveguides. Nevertheless, other passband flattening features may alternatively be used.

According to another aspect of the invention, there is provided a method of substantially avoiding asymmetry in the passband of at least some of the output channels of an AWG comprising: first and second slab waveguides and an array of waveguides optically coupled between the first slab waveguide and the second slab waveguide, the array waveguides having predetermined optical path length differences therebetween, and each said slab waveguide having a first side which is optically coupled to the array waveguides and which has a first radius of curvature, and an opposing second side which has a second radius of curvature which is substantially half the magnitude of said first radius of curvature; and a plurality of output waveguides optically coupled to the second side of the second slab waveguide, for outputting different output channels of the AWG; wherein the method comprises chirping the angular spacing of the array waveguides at the first side of at least the second slab waveguide so that the array waveguide angle $\theta_i$ of the ith array waveguide, with respect to a straight line passing through the centres of curvature of the first and second sides of the second slab waveguide, is defined substantially by the following equation:

$$\theta_i = ArcSine\ (i.\Delta\theta),\ \text{where}\ i=-(N-1)/2,\ -(N-1)/2+1,\ \ldots,\ +(N-1)/2$$

where i is the array waveguide number, N is the number of array waveguides, and $\Delta\theta$ is a constant which may be substantially equal to the angular spacing, at the first side of the second slab, of the two array waveguides at the centre of the array. The ArcSine function may, in practice, be approximated to its third order Taylor expansion.

Embodiments of the invention will now be described by way of example only arid with reference to the accompanying drawings in which:

DETAILED DESCRIPTION OF THE PREFERRED EMBODIMENT

Figure 2:
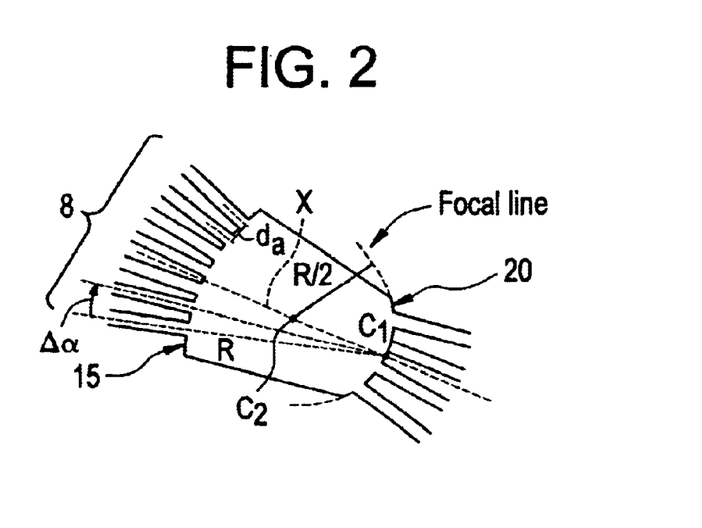
FIG. 2 is a detail view of a portion of the AWG of FIG. 1.

The origin of COMA in a conventional AWG like that of FIGS. 1 and 2 will now be described with reference to FIGS.

Figure 6:
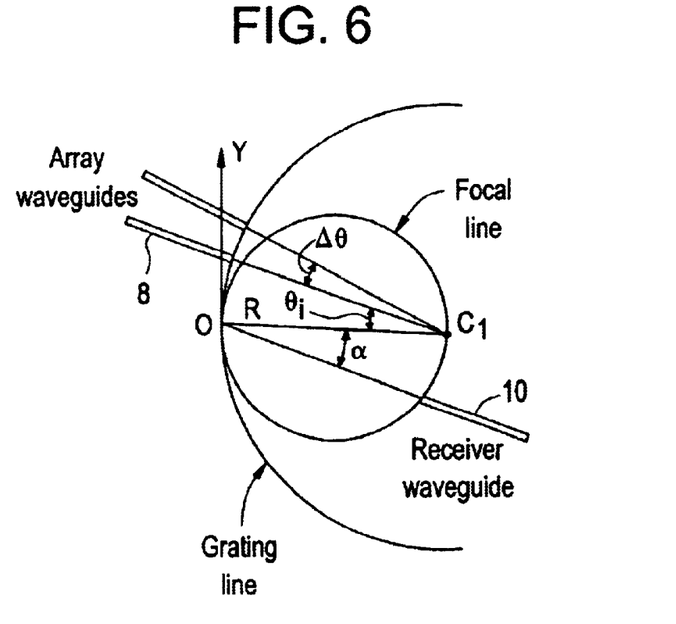
FIG. 6 is a diagram illustrating the design of an array/slab transition in the AWG design of FIGS. 1 and 2.
Figure 7:
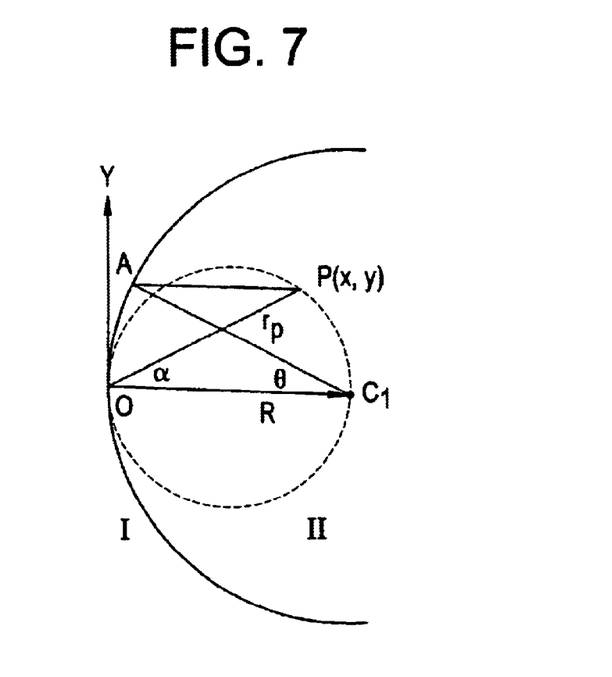
FIG. 7 is another diagram illustrating the origin of COMA imaging error in the AWG of FIGS. 1, 2 and 6.

6 and 7 which show the grating line and focal line of the output slab waveguide 4 of the AWG. AWGs are usually designed with a focal line and grating line as shown in FIG. 6 and with constant (angular) spacing $\Delta\theta$ between the array waveguide branches on the grating line. The array waveguide angle $\theta_i$ is therefore defined as:

$$\theta_i = i.\Delta\theta, i = -(N-1)/2, -(N-1)/2+1, \ldots, +(N-1)/2$$

with i the array waveguide number and N the number of array waveguides, with $\theta_i$ being the angle of the ith array waveguide, relative to the straight line which passes through the centre of curvature $C_1$ of the grating line and the centre of curvature $C_2$ of the focal line. It can be shown that this design causes phase errors that are proportional to the third power of the array waveguide number, resulting in an aberration in the imaging that is often referred to as "COMA". Furthermore it can be shown that this aberration vanishes for the centre receiver (i.e. output) waveguide ($\alpha=0$) and becomes larger for receiver waveguides at increasing distances from the centre. As indicated in FIG. 6, the output waveguides 10 are arranged so as to generally converge towards an aiming point O which lies on the grating line and is collinear with the straight line passing through the centres of curvature $C_1$, $C_2$ of the grating line and the focal line of the slab. COMA is especially undesirable in AWGs that are designed to have a 'flat' filter response, for in these devices the aberration manifests itself as a tilt in the flat top of the filter response, resulting in poor loss uniformity over the pass band, as shown in FIG. 4.

Turning to FIG. 7, it can be shown by geometry that the path-length difference between a transmitter $A_i$ on the grating line (i.e. array waveguide i at the array-slab transition) and a receiver P on the focal line is equal to:

$$A_iP = \sqrt{(r_p\cos\alpha - (R_a - R\cos\theta_i))^2 + (r_p\sin\alpha - R\sin\theta_i)^2}, \quad \text{Eq. 1}$$

with $$\theta_i = i.\Delta\theta,$$

$$i = -(N-1)/2, -(N-1)/2+1, \ldots, +(N-1)/2,$$

and N is the total number of transmitters (i.e. array waveguides), and where the focal line is described by:

$$r_p = R\cos(\alpha) \quad \text{Eq.2}$$

where $\alpha$ is the angle of the receiver waveguide P to the straight line passing through the centre of curvature $C_1$ of the grating line and the centre of curvature $C_2$ (not shown) of the focal line.

Substitution of Eq. 2 in Eq. 1 and substituting $\theta_i$ with $i.\Delta\theta$ results, after Taylor expansion, in;

$$A_iP = R\cos(\alpha) - R\sin(\alpha)\Delta\theta \cdot i + \frac{1}{6}R\sin(\alpha)(\Delta\theta \cdot i)^3 + \quad \text{Eq. 3}$$

$$\frac{1}{8}R(\sin(\alpha)\tan(\alpha))(\Delta\theta \cdot i)^4 + O((\Delta\theta \cdot i)^5) \text{ with } -\frac{\pi}{2} < \alpha < \frac{\pi}{2}$$

From Eq.3 it can be seen that the path length difference $A_iP$ contains a third order term $(\Delta\theta.i)^3$ with respect to the linear (first order) term $\Delta\theta.i$ where i is the transmitter number. This third order aberration is defined as COMA. Furthermore this aberration is proportional to the vertical distance of the receiver P to the stigmatic point $C_1$, which is the centre of curvature of the grating line.

Eliminating COMA

The task is to find a path-function $A_iP$ that does NOT contain a third order term with respect to the array number i. (Nor a second order term, which would correspond to defocusing, which is also undesirable). We have found that this can be achieved by chirping the angular spacing $\Delta\theta$ of the array waveguides (of the unchirped array) at the array/slab interface (i.e. the grating line) so that the waveguide angle (in the chirped array) is defined by the following formula:

$$\theta_i = arcsine(i\Delta\theta) \quad \text{Eq.4}$$

where $\Delta\theta$ is the angular pitch, at the slab, of adjacent array waveguides in the unchirped array. This is in practice very close, but not exactly equal to, the angular spacing of the central array-branch of the chirped array (i.e. the two array waveguides at the centre of the chirped array). Substituting Eq.4 and Eq 2 into Eq. 1 results, after Taylor expansion, in:

$$A_iP = R\cos(\alpha) - R\sin(\alpha)\Delta\theta \cdot i + \quad \text{Eq. 5}$$

$$\frac{1}{8}R(\sin(\alpha)\tan(\alpha))(\Delta\theta \cdot i)^4 + O((\Delta\theta \cdot i)^5) \text{ with } -\frac{\pi}{2} < \alpha < \frac{\pi}{2}$$

Comparing Eq.5 with Eq.3 it is clear that the $3^{rd}$ order term has vanished. By designing the angle $\theta_i$ of the array waveguides in accordance with Eq.4 above, the COMA can thus be entirely removed (in theory), and thus asymmetry in the channel passbands should be completely avoided. However, this will only be the case where the input waveguide (used to input the multiplexed signal to the first slab) has its optical axis aligned with the centres of curvature C1,C2 of the input and output sides of the first slab. If the input waveguide is off-centre, for example where the input waveguide is one of a plurality of input waveguides which intersect with the input side of the first slab either above or below the centre of curvature C1 of the output side of the first slab, then COMA from the first slab will produce some asymmetry in the output channel passband (although the magnitude of this asymmetry will not be dependent on the position of the output waveguide on the output face of the second slab). Thus, in the preferred embodiment we chirp the angle of the array waveguides as described above at both sides of the array i.e. at both the array/second slab transition and the array/first slab transition, so as to remove COMA from both the first and second slabs.

Figure 8:
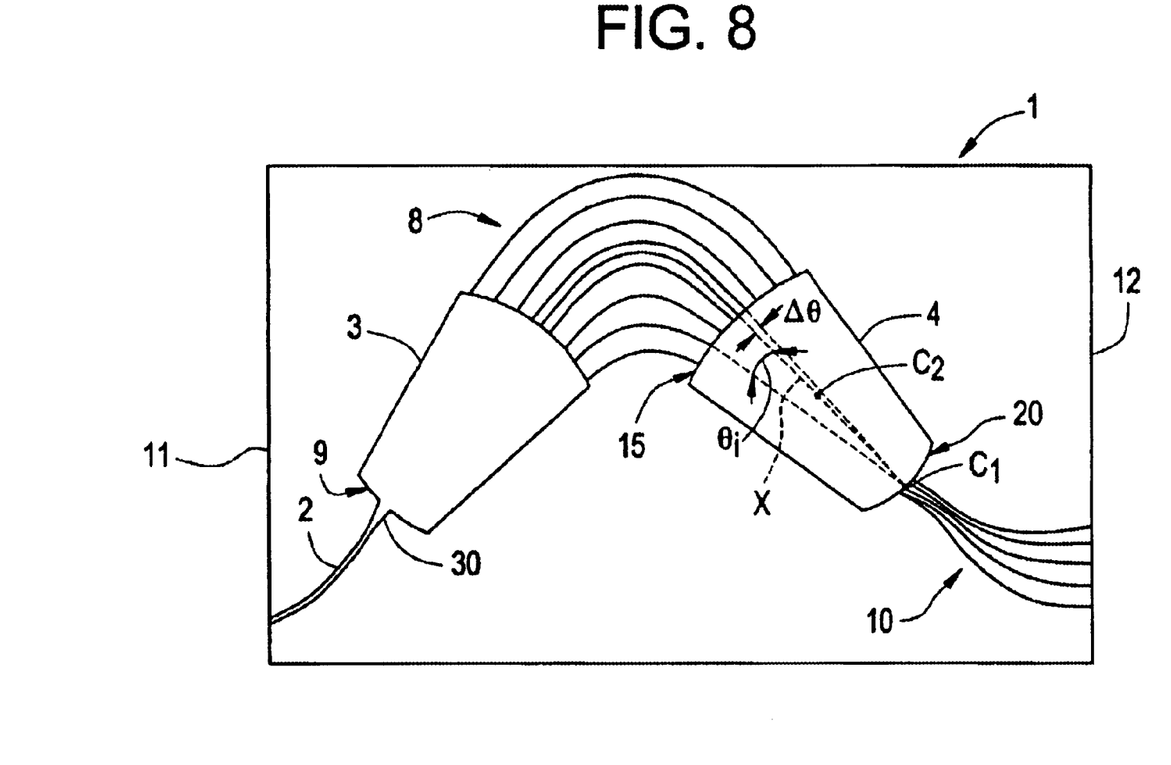
FIG. 8 is a schematic plan view of an improved AWG according to the invention.
Figure 9:
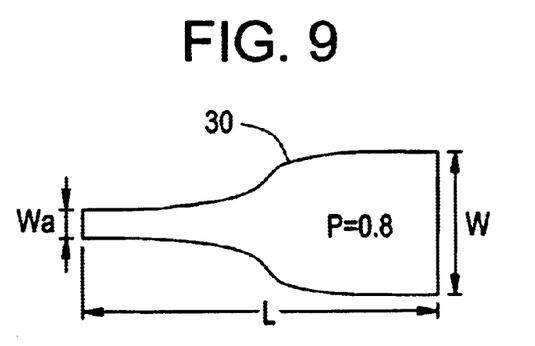
FIG. 9 is a plan view of a passband flattening structure used in the AWG of FIG. 8.

FIG. 8 illustrates schematically (not to scale) an AWG in which the angle of the array waveguides, at the array/slab interface at each side of the array, has been designed according to Eq.4 above, namely:

$$\theta_i = arcsine(i\Delta\theta)$$

where $\theta_i$ is the angle at the slab of the ith array waveguide, with respect to the straight line which passes through the centres of curvature of the grating line and the focal line of the slab, $\Delta\theta$ is the (constant) angular spacing at the slab of adjacent array waveguides in the unchirped array, and i=$-(N-1)/2, -(N-1)/2+1, \ldots +(N-1)/2$. The array waveguide angle is thus chirped at both sides of the array to remove COMA. The AWG incorporates a passband flattening feature 30 connecting a single input waveguide 2 to the first slab waveguide 3. For illustrative purposes the input waveguide has been magnified to show the passband flattening feature 30. The array waveguides 8 and output waveguides are illustrated in single line form. In FIG. 1, only some of the array waveguides 8 and output waveguides 10 are shown: in practice there will be of the order of 300 array waveguides and 40 output waveguides for a 40 channel AWG. The other features of the AWG remain unaltered from the conventional type of AWG described with reference to FIG. 1. The passband flattening feature is a non-adiabatic tapered waveguide having a shape based on a cosine curve, as described in our pending British patent application No. 0114608.3, the entire contents of which have already been incorporated herein by reference. Thus, the tapered waveguide 40 has a curvilinear shape in the form of a perturbed cosine function defined by the following equations:

$$w(t) = w_{in} + \frac{w_{out} - w_{in}}{2}[1 - \cos(2\pi t)]$$

$$z(t) = L\left[t + \frac{p}{2\pi}\sin(2\pi t)\right]$$

t=[0 . . . 1]
where L is the length of the taper section;
w(t) is the width along the propagation direction;
z(t) is the length along the propagation direction;
$w_{in}$ and $w_{out}$ are the widths of the input and output ends respectively of the taper section; and p is a shape factor, which preferably has a value between 0 and 1 for passband flattening, and which basically controls the slope in the middle (z=0.5L) of the taper (values of p greater than 1 are also possible, though less preferred). The structure of the tapered waveguide where p—0.8 is illustrated in FIG. 9. Adiabatic tapers may be provided on the ends of the output waveguides 10 which are coupled to the second slab waveguide, if desired. Such an output waveguide is still considered to be a substantially single-mode output waveguide.

Figure 10:
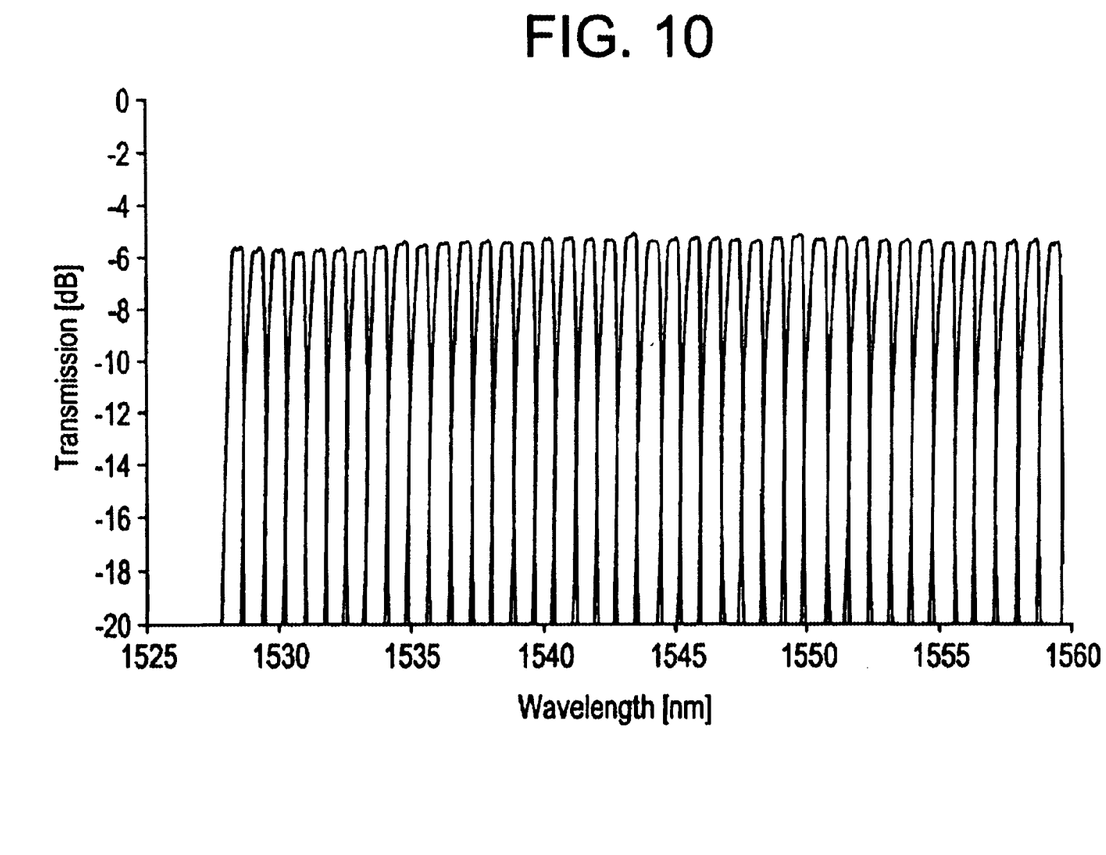
FIG. 10 is a graph illustrating the channel output from a fabricated 40 channel AWG designed in accordance with the invention.

FIG. 10 is a graph illustrating the passbands of a fabricated 40 channel AWG designed in this manner. As can be seen, there is little asymmetry now observable in the channel passbands and the passbands of the 40 output channels are substantially uniform in shape.

Although COMA is (in theory) completely corrected when the array waveguide angle $\theta_i$ is defined exactly by the above described equation:

$\theta_i$=arcsine ($i\Delta\theta$),

COMA will also be substantially corrected as long as the array waveguide angle is defined at least substantially by this equation. For example, COMA will also be (completely) corrected if $\theta_i$ is defined by the third order Taylor expansion of the function arcsine ($i\Delta\theta$) in the above equation i.e. $\theta_i$=$i\Delta\theta$+⅙ ($i^3.\Delta\theta^3$). This is an approximation of the function arcsine ($i\Delta\theta$), but as it contains the third order term ⅙ ($i^3.\Delta\theta^3$), compared to the linear (i.e. first order) term $i\Delta\theta$, which determines COMA, it will cancel out the COMA.

Similarly, it will be appreciated that the COMA will be corrected when the array waveguide angle $\theta_i$ is defined by any function which contains this same third order term, ⅙ ($i^3.\Delta\theta^3$), where the first order term is given by $i\Delta\theta$. For example, a function which also contains further terms proportional to, for example, ($i^2.\Delta\theta^2$), and/or higher order terms such as ($i^4.\Delta\theta^4$), ($i^5.\Delta\theta^5$), or even $i^3$, $i^4$, $i^5$ etc, will still correct the COMA. For example, a higher order Taylor expansion of the above arcsine function could equally be used to define the array waveguide angle, or even another polynomial function defined by: $O_i(i)=i\Delta\theta+a.i^2+⅙(i^3.\Delta\theta^3)+b.i^4+c.i^5+d.i^6+\ldots$, where a,b,c,d . . . are all constants.

It will be appreciated that other modifications and variations are possible without departing from the scope of the invention. For example, it is expressly intended that all combinations of those elements and/or method steps which perform substantially the same function in substantially the same way to achieve the same results are within the scope of the invention. For example, other passband flattening structures, such as for example MMIs, parabolic horns, Y-branch couplers and other suitable passband flattening structures may alternatively be used instead of the illustrated cosine-type tapered waveguide.

For the avoidance of doubt, it is not essential that the input waveguide be a single mode waveguide having the same width along its entire length, right up to where it is connected to the passband flattening feature. For example the input waveguide may be a single mode waveguide which is adiabatically tapered (for example has a linear adiabatic taper) at its end which is connected to the passband flattening feature, so as to widen towards the passband flattening feature. Such an input waveguide is still considered to be a substantially single mode waveguide.

In all of the above-described embodiments, where reference is made to input waveguides and output waveguides, it will be appreciated that these terms are used in relation to when the AWG is used as a demultiplexer. However, it will be understood that the same AWG could equally well be used as a multiplexer, in which case the terms input and output should be interchanged, as optical signals are then travelling through the AWG in the opposite direction. For the avoidance of doubt it will thus be understood that the wording "input" and "output" is not intended to be limiting, the attached claims being intended to cover an AWG which is used as a demultiplexer or as a multiplexer.

Figure 11:
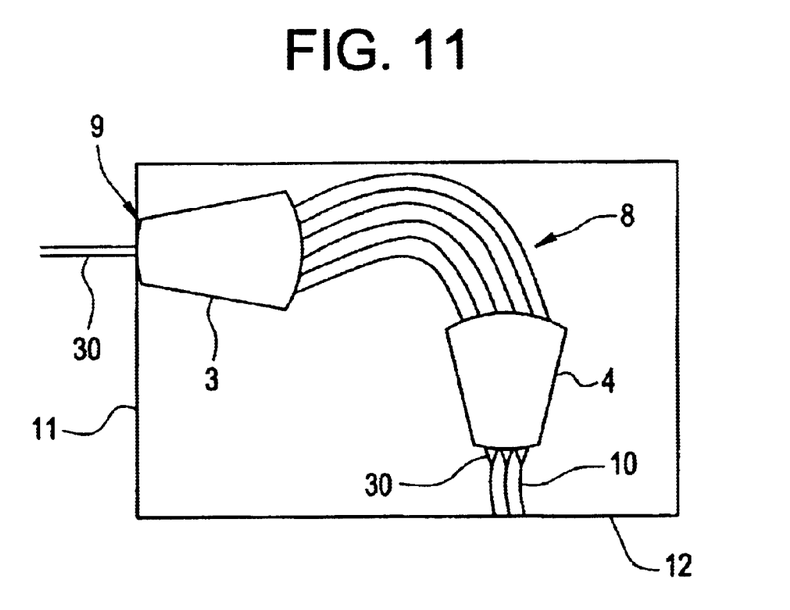
FIG. 11 is a schematic plan view of an AWG according to another embodiment of the invention.

Furthermore, a passband flattening feature 30 could instead be disposed between each output waveguide 10 and the second slab coupler 4, instead of between the input waveguide and the input slab coupler 3, to achieve the desired passband flattening. The widest end of the passband flattening feature would be connected to the output face 20 of the output slab coupler 4, and the thinnest end would merge smoothly into the substantially single mode output waveguide 10. Adiabatic tapers may then be provided on the ends of the input waveguides which are coupled to the first slab coupler, if desired, so that the input waveguides widen towards the first slab coupler. In a modified version of this embodiment there may be no input waveguides. Instead, the input side 9 of the first slab waveguide 3 would be located at the input edge 11 of the die 1 and the multiplexed input signal would be coupled directly from an input fibre to the first slab waveguide 3, by coupling the input fibre directly to the first slab waveguide, as illustrated in FIG. 11. If the angular spacing of the array waveguides is chirped at both sides of the array, as above-described, then even if the input waveguide is not perfectly aligned with the centre of curvature of the first side of the first slab, no asymmetry due to COMA from either the first slab or the second slab will be present in the flattened passband shape of the AWG output channel. The input edge 11 of the die, and the end of the input fibre 30, are both diced at approximately 8 degrees to the plane perpendicular to the optical axis in order to minimize back reflection down the input fibre. The convolution of the double-peak field produced by the passband flattening features at the output side of the device, with the fundamental mode of the output optical fibres which would be coupled to the output edge 12 of the die 1 to receive the output channel signals from the output waveguides 10, produces the required flattened passband. In the preferred version of this embodiment, the input and output slabs 3,4 may be arranged on the die 1 with their respective axes generally at 90 degrees to one another, whereby the output face of the die is now adjacent the input face 11.

Also, in another possibility a substantially identical passband flattening feature may be provided between both the input slab waveguide and each input waveguide and between the output slab waveguide and each output waveguide 10. (The passband flattening features need not necessarily be of identical size on both the input and output sides. In fact, making them a different size will allow a greater degree of design freedom.)

The invention is also applicable to AWGs which do not incorporate a specific passband flattening feature. In this case, although the channel passbands will have the conventional Gaussian shape, some benefit can still be achieved by chirping the angle of the array waveguides at the array/slab transitions, especially at the array/output slab transition as above-described, whereby any asymmetry (due to COMA) which would have been present in the output channel passband if chirping had not been used, is substantially avoided.

In some embodiments the AWG may have a plurality of input waveguides optically coupled to the first slab, and one or more passband flattening features disposed between the slabs and one or more of the input and output wave guides. In these embodiments some benefit (in term of reduction of asymmetry) may be achieved by only chirping the array waveguide angle at the array/input slab transition, but it will be appreciated that greater benefit will be achieved by chirping the array waveguides at the array/output slab transition and/or at both sides of the array.

What is claimed is:

1. An arrayed waveguide grating (AWG) comprising:
first and second slab waveguides and an array of waveguides optically coupled between the first slab waveguide and the second slab waveguide, the array waveguides having predetermined optical path length differences therebetween, and each said slab waveguide having a first side which is optically coupled to the array waveguides and which has a first radius of curvature, and an opposing second side which has a second radius of curvature which is substantially half the magnitude of the first radius of curvature; a plurality of output waveguides optically coupled to the second side of the second slab waveguide; wherein at the first side of the second slab waveguide the array waveguide angle $\theta_i$ of the ith array waveguide, with respect to a straight line passing through the centres of curvature of the first and second sides of the second slab waveguide, is defined substantially by the following equation:

$$\theta_i = ArcSine\ (i.\Delta\theta), \text{ where } i = -(N-1)/2, -(N-1)/2+1, \ldots, +(N-1)/2$$

where i is the array waveguide number, N is the number of array waveguides, and $\Delta\theta$ is a constant.

2. An AWG according to claim 1, wherein the array waveguide angle $\theta_i$ is defined by a Taylor expansion of the function ArcSine (i.$\Delta\theta$).

3. An AWG according-to claim 2, wherein the array waveguide angle $\theta_i$ is defined by the third order Taylor expansion of the function ArcSine (i.$\Delta\theta$), namely by the equation:

$$\theta_i = i\Delta\theta + \tfrac{1}{6}\ (i^3.\Delta\theta^3).$$

4. An AWG comprising:
first and second slab waveguides and an array of waveguides optically coupled between the first slab waveguide and the second slab waveguide, the array waveguides having predetermined optical path length differences therebetween, and each said slab waveguide having a first side which is optically coupled to the array waveguides and which has a first radius of curvature, and an opposing second side which has a second radius of curvature which is substantially half the magnitude of the first radius of curvature; a plurality of output waveguides optically coupled to the second side of the second slab waveguide; wherein at the first side of the second slab waveguide the array waveguide angle $\theta_i$ of the ith array waveguide, with respect to a straight line passing through the centres of curvature of the first and second sides of the second slab waveguide, is defined by a function $\theta_i$ (i), where:
$\theta_i(i) = i\Delta\theta + a.i^2 + \tfrac{1}{6}(i^3.\Delta\theta^3) + b.i^4 + c.i^5 + d.i^6 + \ldots$, where i is the array waveguide number and is given by i=-(N-1)/2, -(N-1)/2+1, . . . , +(N-1)/2, where N is the number of array waveguides, and $\Delta\theta$ is a constant, and a,b,c,d, . . . are all constants.

5. An AWG according to claim 1, wherein the output waveguides are substantially single-mode waveguides and the AWG further includes: at least one substantially single-mode input waveguide optically coupled to the second side of the first slab waveguide; and passband flattening means disposed between at least one of the substantially single mode input and output waveguides and an adjacent one of the first and second slab waveguides.

6. An arrayed waveguide grating (AWG) according to claim 1, wherein the output waveguides are substantially single-mode waveguides and the AWG further includes passband flattening means disposed between each said substantially single mode output waveguide and the second slab waveguide.

7. An AWG according to claim 5, wherein the passband flattening means comprises a non-adiabatic tapered waveguide which widens in width towards the respective slab waveguide, and at least an initial portion of the non-adiabatic tapered waveguide which initial portion is connected to said at least one of the substantially single mode input and output waveguides has a taper angle which increases towards said respective slab waveguide, and the non-adiabatic tapered waveguide merges substantially continuously with said at least one of the substantially single mode input and output waveguides.

8. An AWG according to claim 1, wherein at the first side of the first slab waveguide the array waveguide angle $\theta_i$ of the ith array waveguide, with respect to a straight line passing through the centres of curvature of the first and second sides of the first slab waveguide, is defined substantially by the equation:

$$\theta_i = ArcSine\ (i.\Delta\theta), \text{ where } i = -(N-1)/2, -(N-1)/2+1, \ldots, +(N-1)/2$$

where i is the array waveguide number, N is the number of array waveguides, and $\Delta\theta$ is a constant.

9. An AWG according to any claim 1, wherein the constant $\Delta\theta$ is substantially equal to the angular spacing, at the first side of the second slab waveguide, of adjacent array waveguides at the centre of the array.

10. A method of substantially avoiding asymmetry in the passband of at least some of the output channels of an AWG comprising: first and second slab waveguides and an array of waveguides optically coupled between the first slab waveguide and the second slab waveguide, the array waveguides having predetermined optical path length differences therebetween, and each said slab waveguide having a first side which is optically coupled to the array waveguides and which has a first radius of curvature, and an opposing second side which has a second radius of curvature which is substantially half the magnitude of said first radius of curvature; a plurality of output waveguides optically coupled to the second side of the second slab waveguide, for outputting different output channels of the AWG; wherein the method comprises chirping the angular spacing of the array waveguides at the first side of at least the second slab waveguide so that the array waveguide angle $\theta_i$ of the ith array waveguide, with respect to a straight line passing through the centres of curvature of the first and second sides of the second slab waveguide, is defined substantially by the following equation:

$$\theta_i = ArcSine\ (i.\Delta\theta), \text{ where } i=-(N-1)/2, -(N-1)/2+1, \ldots, +(N-1)/2$$

where i is the array waveguide number, N is the number of array waveguides, and $\Delta\theta$ is a constant.

11. A method according to claim 10, wherein the array waveguide angle $\theta_i$ is defined by the equation:

$$\theta_i = i\Delta\theta + \tfrac{1}{6}(i^3.\Delta\theta^3).$$

12. A method according to claim 10, wherein the output waveguides are substantially single mode waveguides and the AWG further includes at least one substantially single-mode input waveguide optically coupled to the second side of the first slab waveguide; and the method further includes flattening the passband of the AWG by disposing passband flattening means between at least one of the substantially single mode input and output waveguides and an adjacent one of the first and second slab waveguides.

13. A method according to claim 10, wherein the output waveguides are substantially single-mode waveguides and the method further includes flattening the passband of the AWG by disposing passband flattening means between each said substantially single mode output waveguide and the second slab waveguide.

14. A method according to claim 10, wherein the method further includes chirping the angular spacing of the array waveguides at the first side the first slab waveguide so that the array waveguide angle $\theta_i$ of the ith array waveguide, with respect to a straight line passing through the centres of curvature of the first and second sides of the first slab waveguide, is defined substantially by the following equation:

$$\theta_i = ArcSine\ (i.\Delta\theta), \text{ where } i=-(N-1)/2, -(N-1)/2+1, \ldots, +(N-1)/2$$

where i is the array waveguide number, N is the number of array waveguides, and $\Delta\theta$ is a constant.

15. An AWG according to claim 14, wherein the function ArcSine (i.$\Delta\theta$) is approximated to the third order Taylor expansion thereof, namely; $i\Delta\theta + \tfrac{1}{6}(i^3.\Delta\theta^3)$.

16. An arrayed waveguide grating (AWG) comprising:
first and second slab waveguides and an array of waveguides optically coupled between the first slab waveguide and the second slab waveguide, the array waveguides having predetermined optical path length differences therebetween, and each said slab waveguide having a first side which is optically coupled to the array waveguides and which has a first radius of curvature, and an opposing second side which has a second radius of curvature which is substantially half the magnitude of the first radius of curvature;

a plurality of substantially single-mode input waveguides optically coupled to the second side of the first slab waveguide;

a plurality of substantially single-mode output waveguides optically coupled to the second side of the second slab waveguide; and passband flattening means disposed between at least one of the substantially single mode input and output waveguides and an adjacent one of the first and second slab waveguides;

wherein at the first side of the first slab waveguide the array waveguide angle $\theta_i$ of the ith array waveguide, with respect to a straight line passing through the centres of curvature of the first and second sides of the first slab waveguide, is defined substantially by the following equation:

$$\theta_i = ArcSine\ (i.\Delta\theta), \text{ where } i=-(N-1)/2, -(N-1)/2+1, \ldots, +(N-1)/2$$

where i is the array waveguide number, N is the number of array waveguides, and $\Delta\theta$ is a constant.

17. An AWG according to claim 16, wherein the constant $\Delta\theta$ is substantially equal to the angular spacing, at the first side of the first slab waveguide, of the two array waveguides at the centre of the array.

18. A method of substantially avoiding asymmetry in the passband of at leas some of the output channels of an AWG comprising: first and second slab waveguides and an array of waveguides optically coupled between the first slab waveguide and the second slab waveguide, the array waveguides having predetermined optical path length differences therebetween, and each said slab waveguide having a first side which is optically coupled to the array waveguides and which has a first radius of curvature, and an opposing second side which has a second radius of curvature which is substantially half the magnitude of said first radius of curvature; a plurality of output waveguides optically coupled to the second side of the second slab waveguide, for outputting different output channels of the AWG; wherein the method comprises chirping the angular spacing of the array waveguides at the first side of at least the second slab waveguide so that the array waveguide angle $\theta_i$ of the ith array waveguide, with respect to a straight line passing through the centres of curvature of the first and second sides of the second slab waveguide, is defined substantially by a function $\theta_i$ (i), where:

$$\theta_i(i) = i\Delta\theta + a.i^2 + \tfrac{1}{6}(i^3.\Delta\theta^3) + b.i^4 + c.i^5 + d.i^6 + \ldots,$$

where i is the array waveguide number and is given by $i=-(N-1)/2, -(N-1)/2+1, \ldots, +(N-1)/2$, where N is the number of array waveguides, and $\Delta\theta$ is a constant, and a,b,c,d, . . . are all constants.

* * * * *